(12) United States Patent
Holdrege et al.

(10) Patent No.: US 6,845,087 B1
(45) Date of Patent: Jan. 18, 2005

(54) WIDEBAND WIRELESS COMMUNICATIONS ARCHITECTURE

(75) Inventors: Ward A. Holdrege, Manhattan Beach, CA (US); Daniel J. Wood, Long Beach, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/400,527

(22) Filed: Sep. 20, 1999

(51) Int. Cl.[7] ............................................. H04B 7/216
(52) U.S. Cl. .................... 370/335; 370/342; 370/337; 375/131
(58) Field of Search ............................. 375/145, 134, 375/131, 137, 149, 141; 370/335, 342, 441, 337

(56) References Cited

U.S. PATENT DOCUMENTS

| | | | |
|---|---|---|---|
| 3,806,804 A | 4/1974 | Mills et al. ................. 325/55 |
| 4,125,808 A | 11/1978 | Graham ....................... 325/55 |
| 4,145,657 A | 3/1979 | Hanni ......................... 325/32 |
| 4,451,699 A | 5/1984 | Gruenberg ............... 179/2 EB |
| 4,703,474 A | 10/1987 | Foschini et al. .............. 370/18 |
| 4,763,322 A | * 8/1988 | Eizenhofer .................. 370/337 |
| 4,771,448 A | 9/1988 | Koohgoli et al. ............ 379/60 |
| 4,881,271 A | 11/1989 | Yamauchi et al. ........... 455/56 |
| 4,901,307 A | 2/1990 | Gilhousen et al. ........... 370/18 |
| 5,056,109 A | 10/1991 | Gilhousen et al. ............ 375/1 |
| 5,073,900 A | 12/1991 | Mallinckrodt ................ 375/1 |
| 5,101,501 A | 3/1992 | Gilhousen et al. ........... 455/33 |
| 5,138,631 A | 8/1992 | Taylor .......................... 375/1 |
| 5,159,625 A | 10/1992 | Zicker ......................... 379/59 |
| 5,161,168 A | 11/1992 | Schilling ....................... 375/1 |
| 5,239,682 A | 8/1993 | Strawcynski et al. ...... 455/54.1 |
| 5,265,150 A | 11/1993 | Helmkamp et al. .......... 379/58 |
| 5,276,908 A | 1/1994 | Koohgoli et al. .......... 455/34.1 |
| 5,285,469 A | 2/1994 | Vanderpool ................... 375/1 |
| 5,341,397 A | 8/1994 | Gudmundson ................. 375/1 |
| 5,345,469 A | * 9/1994 | Fulghum ..................... 370/342 |
| 5,361,399 A | 11/1994 | Linquist et al. ............ 455/56.1 |
| 5,375,140 A | 12/1994 | Bustamante et al. ........... 375/1 |
| 5,408,419 A | 4/1995 | Wong ......................... 364/514 |
| 5,408,680 A | 4/1995 | Hattey et al. ................. 455/15 |
| 5,416,797 A | 5/1995 | Gilhousen et al. .......... 375/705 |
| 5,425,051 A | 6/1995 | Mahany ...................... 375/202 |
| 5,434,798 A | 7/1995 | Madebrink et al. ......... 364/514 |
| 6,078,572 A | 6/2000 | Tanno et al. |
| 6,128,288 A | * 10/2000 | Miya .......................... 370/335 |
| 6,266,363 B1 | * 7/2001 | Hiramatsu .................. 375/141 |

FOREIGN PATENT DOCUMENTS

| | | | | |
|---|---|---|---|---|
| JP | 9-233040 | 9/1997 | | |
| JP | 9-233051 | 9/1997 | | |
| JP | 09-321665 | * 12/1997 | ........... H04B/1/707 |
| JP | 10-101421 | 7/1998 | | |
| JP | 11-234242 | 8/1999 | | |

\* cited by examiner

*Primary Examiner*—Thanh Cong Le
*Assistant Examiner*—Lana Le
(74) *Attorney, Agent, or Firm*—Tarolli, Sundheim, Covell & Tummino L.L.P.

(57) ABSTRACT

A wireless communication network that generally establishes a source node transmit window (during which a type A node transmits signals) and a source node receive window (during which the type A node receives signals). The node may then transmit over a CDMA link during the source node transmit window to a destination node. Similarly, the source node receives over the CDMA link from the destination node during the source node receive window. The duration of the source node transmit and source node receive windows may be of any duration. Type B nodes adopt the opposite transmit and receive timing as a type A node after assimilation. The network provides a technique for assimilating new nodes, in which new nodes transmit their own reservation channels in a handshaking sequence, and CDMA spreading codes are assigned until all available spreading codes are in use.

18 Claims, 8 Drawing Sheets

Local Node Configuration

WIDEBAND WIRELESS COMMUNICATIONS ARCHITECTURE

BACKGROUND OF THE INVENTION

The present invention relates to communication systems. In particular, the present invention relates to an adaptable wideband wireless communications architecture incorporating code division and time division multiple access techniques.

Multiple access communications systems provide ordered access to a common communication channel to multiple users or nodes. Wireless communication systems are typically multiple access systems. As an example, cellular phone networks share one or more subbands in the radio frequency (RF) spectrum divided into time division multiple access (TDMA) time slots for multiple nodes. As another example, satellite receivers often receive a TDMA uplink centered in a very high frequency band (e.g., tens of gigahertz).

Communication systems are further characterized by duplex (sometimes referred to as full duplex) or simplex (sometimes referred to as half-duplex) operation. Simplex operation proceeds by allowing only one node to transmit over a connection while the other nodes are receiving on that connection. On the other hand, duplex operation allows simultaneous transmission and reception by the nodes on the connection.

In addition to time division techniques that provide access for multiple users, communication systems may use frequency division techniques. As an example, the original cellular telephone standard, AMPS (Advanced Mobile Phone Service), implements frequency division multiple access and frequency division duplex operation. In AMPS, the RF spectrum is divided into two broad bands, one for "forward" (base station to mobile) connections, and the other for "reverse" (mobile to base station) connections. Each band is further divided into multiple frequency channels, and each frequency channel is partitioned according to TDMA techniques to provide an overall capacity for thousands of nodes.

Frequency division techniques, however, have typically required interference limiting isolation between frequency bands. For example, past systems relied on complex and expensive radio frequency isolation equipment to maintain separation in the received signals. Furthermore, a significant amount of the RF spectrum was wasted on guard bands to further increase frequency isolation.

In recent years, a third type of communication technique, code division multiple access (CDMA), has started to emerge in commercial systems. In a CDMA system, an input data stream is modulated by a spreading code at a much higher data rate (sometime referred to as the chip rate) than that of the input data stream itself. The output of the modulation thus has many more transitions that the input data itself and eventually results in a transmitted signal "spread" over a wide frequency band.

The input data may be recovered at a receiver by correlating the received signal with the original spreading code. Other signals may be present in the received signal, including interference and additional spread spectrum signals (created with additional, uncorrelated spreading codes). However, in general, the additional signals produce an output that appears as random noise with respect to the desired spreading code. Thus, multiple nodes may transmit overlapping spread spectrum signals without preventing recovery of the other simultaneously transmitted signals.

Wireless communication systems typically reuse the frequency spectrum in physically separate locations to make the most of the RF resource. Thus, a reuse plan including multiple cells is established and may provide, for example, a seven-to-one reuse ratio. In other words, seven frequency bands are used and reassigned across the reuse plan to minimize co-channel interference and increase capacity.

Extensive planning must be performed beforehand to select, establish, and allocate cell sites and portions of the RF resource to reliably operate a wireless communication system. This process is made even more complicated by the fact that, in the past, fixed base station nodes were used in each cell site, and the base station nodes were interconnected with a hardwired network. Furthermore, past cell sites required very tightly controlled geometry in which, for example, no base station was allowed to deviate from cell alignment by more than 10%.

Using mobile base stations or deploying base stations without precise pre-planning for a wireless communication system was extremely difficult, and nearly impossible if the communication system were based on wireless trunks. One significant source of difficulty lay in the past use of duplex operation on separate frequencies. Such duplex operation invariably leads to a map problem as the network grows in which a node is both transmitted and receiving simultaneously on the same frequency, an extremely difficult task.

Thus, in the past, the pre-planning required to implement a communication system prevented the communication system from easily employing mobile base station nodes, or wireless trunks. In addition, past communication systems were generally unable to integrate new nodes into a network without the extensive pre-planning. As a result, past wireless communication networks have been static, immutable entities. In other words, it has not been possible to dynamically deploy, extend, and geometrically alter a wireless communication network without requiring expensive, time consuming, and complex transmission engineering for satisfactory operation. These shortcomings are even more prevalent with respect to wireless (as opposed to hardwired) trunks between nodes such as base stations. Thus, past wireless communication networks have been unduly limited in their size, bandwidth, and adaptability.

A need has long existed in the industry for a deployable, extendable, alterable communications network that does not incur the costs associated with complex transmission reengineering.

BRIEF SUMMARY OF THE INVENTION

It is an object of the present invention to provide a wireless communication system.

Another object of the present invention is to provide a wireless communication system that is extendable without significant transmission engineering or planning.

It is another object of the present invention to provide a wireless communication system incorporating mobile hubs.

Yet another object of the present invention is to wirelessly interlink mobile hubs in a communication system.

Another object of the present invention is to provide a wireless communication system that uses synchronized time division duplex, spread-spectrum connections that are channelized by code division multiple access techniques.

One or more of the foregoing objects is met in whole or in part by a method of operating a wireless communication network. The wireless communication network generally establishes a source node transmit window (during which the source node transmits signals) and a source node receive window (during which the source node receives signals).

The source node may then transmit over a first spread spectrum (e.g., CDMA) link during the source node transmit window to a destination node. Similarly, the source node receives over the first CDMA link from the destination node during the source node receive window. The physical level protocol thus incorporates time domain duplex communication over a code division multiple access (CDMA) link defined by a single spreading code. Additional time division duplex, CDMA links may be used between any two nodes.

The nodes that may be used in the wireless communication network include hubs (which are capable of supporting multiple links between multiple users), and users (which generally support a single link to another node). The underlying physical level protocol may be used for communication between two hubs, two users, users and hubs, or any combination or users and hubs in a network. Furthermore, the duration of the source node transmit and source node receive windows may be chosen freely, and may even by unequal in duration.

In general, the nodes may be segmented into type A nodes and type B nodes. Type A nodes transmit during a transmit window of time, while type B nodes receive during that same transmit window of time. The opposite is also true. Type A nodes received during the receive window of time, while the type B nodes transmit during that same receive window of time.

The present wireless communication system also provides an expandable wireless communication network including users capable of supporting a link to a hub, and hubs capable of supporting multiple links between users. In operation, the communication system establishes a source node transmit window and a source node receive window, selects a first assignable CDMA spreading code for use in a first communication link, and transmits during the source node transmit window a reservation channel carrying the first assignable CDMA spreading code.

The source node may then detect a handshaking response during the source node receive window and in response to a successful handshake select a second assignable CDMA spreading code for use in a second communication link. The source node then transmits during the source node transmit window the reservation channel carrying the second assignable CDMA spreading code. In this fashion, new nodes may assimilate to the network (and transmit their own reservation channels) until all available CDMA spreading codes are in use.

While assimilating, the new node adopts the opposite transmit and receive window timing as the source node. Thus, a type B node results from assimilation to a type A node, and a type A node results from assimilation to a type B node. As a result of the handshaking process the source node subsequently transmits to the destination node during the source node transmit window using the assigned CDMA spreading code. The source node also receives from the destination node during the source node receive window, again using the assigned CDMA spreading code.

The CDMA channels determined by the assigned spreading codes may be used as Asynchronous Transfer Mode (ATM) virtual circuits. The virtual circuits may also be associated with a Quality of Service. The above noted process may repeat any number of times, with each new hub and each new user extending the underlying wireless communication network without the need for time consuming and expensive engineering preplanning.

From the vantage point of a new node assimilating to the network, the new node typically begins the assimilation by scanning for a reservation channel. When the reservation channel is found, and its burst timing acquired, the new node extracts the assignable CDMA spreading code present in the reservation channel. The new node may then transmit a handshaking response on the reservation channel (during the receive window of the originating node) with control information, registration information, and the like.

Upon successful handshaking, the new node may, for example, begin to transmit its own reservation channel. Thus, the new node may assimilate additional users and hubs into the wireless communication network in the same way as the original node. As noted above, each node adopts the opposite transmit and receive timing as the node to which it assimilates. Thus, the time domain duplex nature of the wireless communication network is preserved and extended as the network grows.

DETAILED DESCRIPTION OF THE INVENTION

Figure 1:
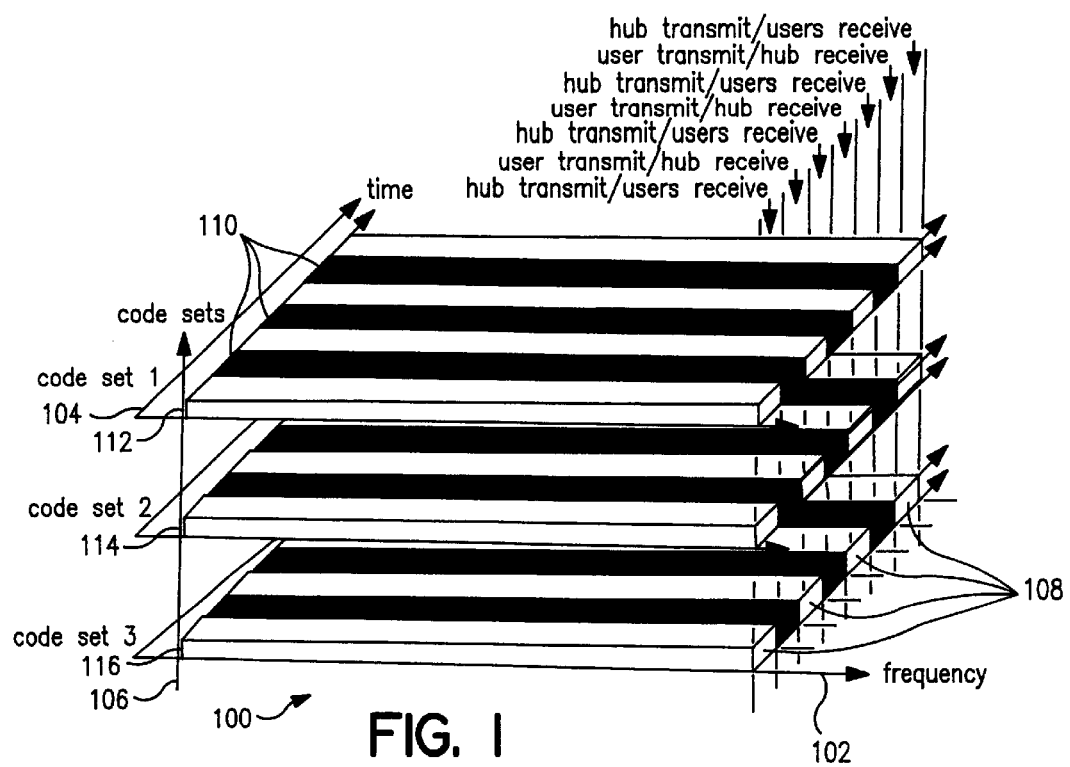
FIG. 1 illustrates a time division duplex, code division multiple access communication technique.

Turning now to FIG. 1, that figure illustrates a time division duplex, code division multiple access communication structure 100. The structure 100 includes a frequency axis 102, time axis 104, and a code axis 106, as well as hub transmit windows 108 and hub receive windows 110. A first signal 112, a second signal 114, and a third signal 116 are also identified in FIG. 1.

In the structure 100, the frequency axis 102 represents a frequency bandwidth associated with a spread spectrum signal. For example, each CDMA signal may occupy a bandwidth of 1.25 MHz. The code axis 106 indicates a separation between individual communication signals with unique spreading codes. Thus, the first signal 112 is spread with, for example, a CDMA spreading code unique from that used to spread the second signal 114 and the third signal 116. Furthermore, a time division structure is imposed on each CDMA link to divide the CDMA links into transmit windows 108 and receive windows 110.

The structure 100 shown in FIG. 1 provides the present invention with a time division duplex, code division multiple access physical layer. The structure 100, as explained in more detail below, provides an effective mechanism for establishing and expanding a wireless communication network. The network may include as few as two nodes in communication and may continue to grow as long as additional CDMA spreading codes are available or frequencies may be reused due to sufficient distance between nodes (in much the same fashion as a cellular reuse plan).

Figure 2:
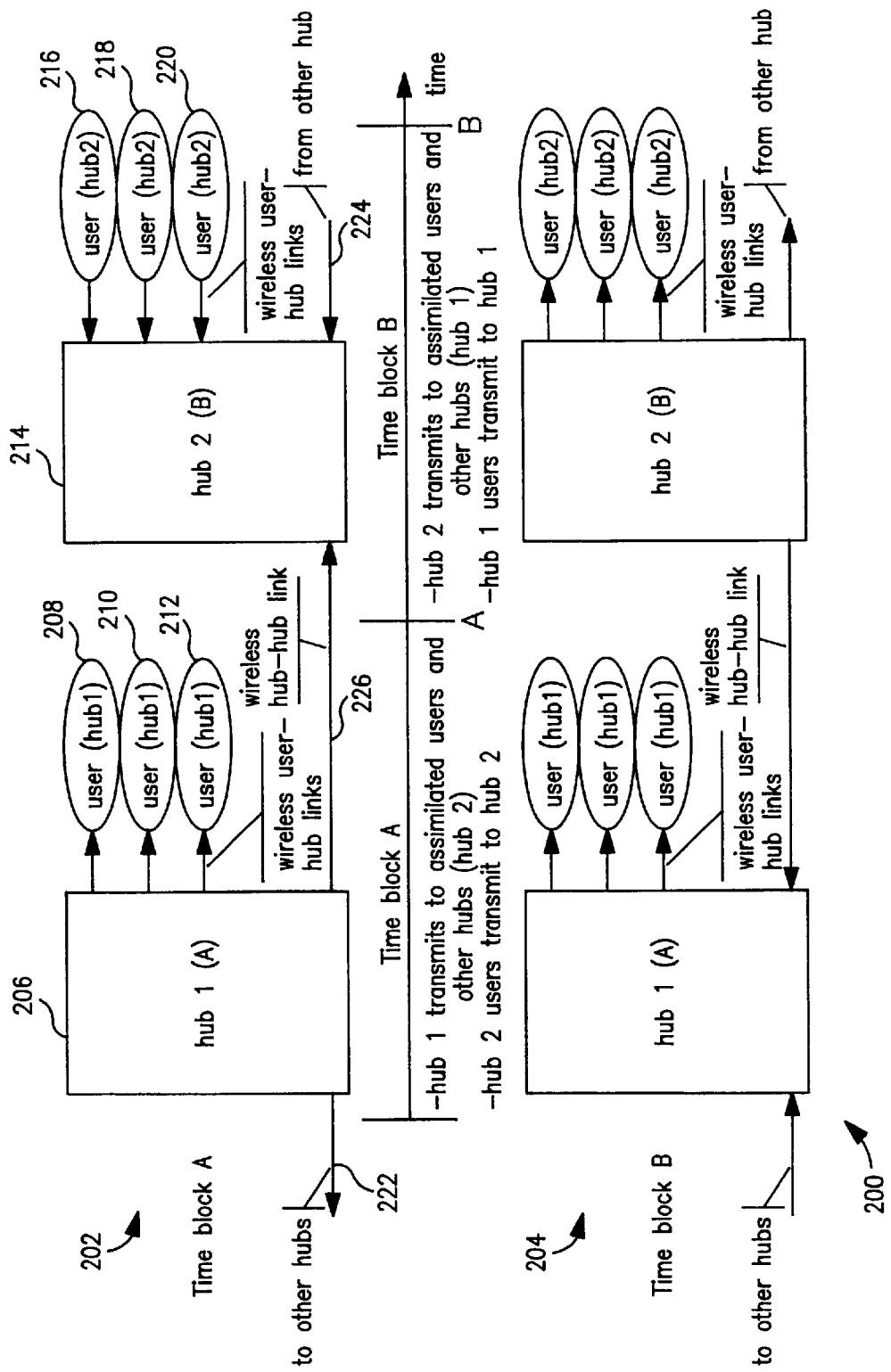
FIG. 2 shows a hub and a set of users assimilating to an existing network hub.

Turning now to FIG. 2, a schematic diagram of a communication network 200 is illustrated. The network 200 generally shows a transmit window 202 and a receive window 204 (both with respect to the "type A" hub node 206). In the transmit window 202 the hub node 206 (which may be, for example, the initial hub established in the network 200) is shown transmitting to the user nodes 208–212 and the second hub node 214 (over the link 226). In turn, the second hub node 214 is shown receiving from user nodes 216–220. The wireless links 222, 224 connect the hubs 206, 214 to one or more additional nodes (not shown).

The transmit window 202 establishes a time during which signals are transmitted from the first hub node 206. The transmit window for the first hub node 206 is thus the receive window for the user nodes 208–212 and the second hub node 214. In general, when a new node assimilates to another node, the new node adopts the opposite transmit and receive timing. Thus, the communication network may be considered to include type A nodes and type B nodes, depending on when their particular transmit and receive windows occur.

As an example, labeling the first hub node 206 a type A node, the user nodes 208–212 and the second hub node 214 adopt the opposite transmit and receiving window timing from the hub node 206 and are thus type B nodes. The user nodes 216–220, which assimilate to the second hub node 214, are thus type A nodes (having assimilated to a type B node), and transmit and receive during the same intervals as the first hub is node 206 (and all other type A nodes).

With respect to the receive window 204, FIG. 2 shows that the first hub node 206 receives during that time from the user nodes 208–212 and the second hub node 214. In turn, the second hub node 214 transmits to the user nodes 216–220. In other words, the receive window 204 establishes a time during which signals are received by type A nodes and a time during which signals are transmitted from type B nodes.

The transmit window 202 and the receive window 204 illustrate the time division duplex nature of communications in the wireless network 200. In particular, the link 226 between the first hub node 206 and the second hub node 214 is preferably formed using a single spreading code shared between the first hub node 206 and the second hub node 214. However, the first hub node 206 and the second hub node 214 alternately transmit and receive in time in a ping-pong fashion (see FIG. 1). Thus, no frequency guard bands or expensive frequency isolation equipment are required, as in full duplex communication systems using separate transmit and receive frequencies. In general, each link between two nodes is supported by a separate spreading code and divided into a time division structure. It is also noted that the transmit windows and receive windows may vary widely in duration and need not be of equal length.

Figure 3:
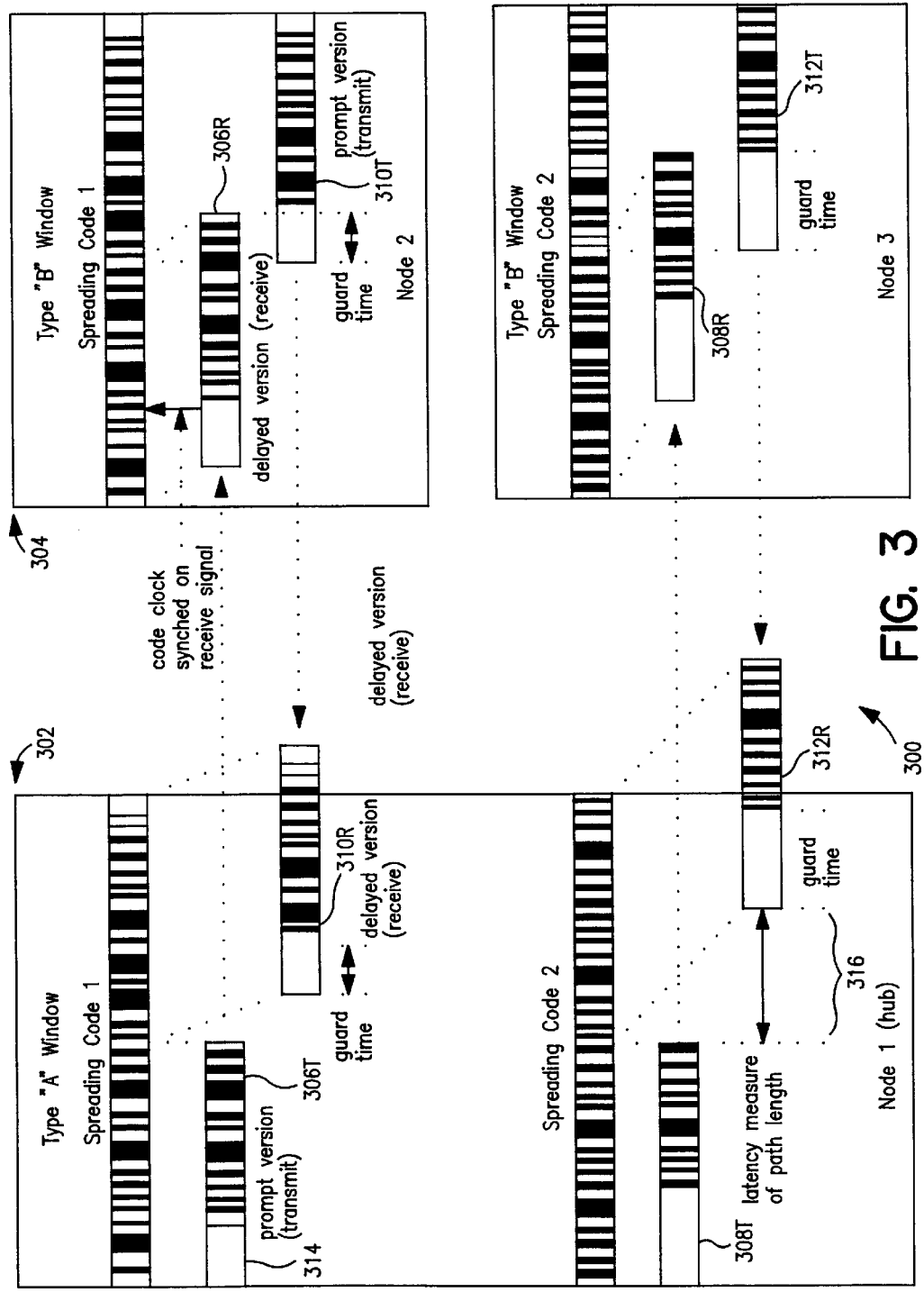
FIG. 3 illustrates the transmit and receive timing of type A and type B nodes.

Turning to FIG. 3, that figure shows a diagram 300 of transmit and receive timing for type A nodes and type B nodes. A type A window 302 and a type B window 304 are shown. The type A node transmits a first signal 306T with a first spreading code and a second signal 308T with a second spreading code. The type A node also receives, subsequently, a third signal 310R on the first spreading code and a fourth signal 312R on the second spreading code. Similarly, the type B node transmits the signal 310T with the first spreading code and the signal 312T with a second spreading code. The type B node also receives, initially, the signal 306R on the first spreading code and the signal 308R on the second spreading code.

The type A nodes transmits the signal 306T to the type B node. The signal 306T includes a portion of guard time 314 (as do the other signals). The signal 306T is transmitted in accordance with transmit window timing (and received as signal 306R), but may be delayed or advanced depending on propagation delay considerations. In other words, the type A node receives the signal 310R (in response to the transmitted signal 310T) from the type B node and may determine a round trip propagation delay that indicates how far to advance or retard transmit timing.

The propagation delay is also indicated in FIG. 3 with respect to the signals 308T, 308R, 312T, and 312R, and the round trip delay 316. In conjunction with the overall timing structure of the present invention, a mechanism for distributing absolute time is also provided. Suitable mechanisms include those used in, for example, the IP time protocol, laser range finders, and Global Positioning Satellite equipment ("GPS").

Figure 4:
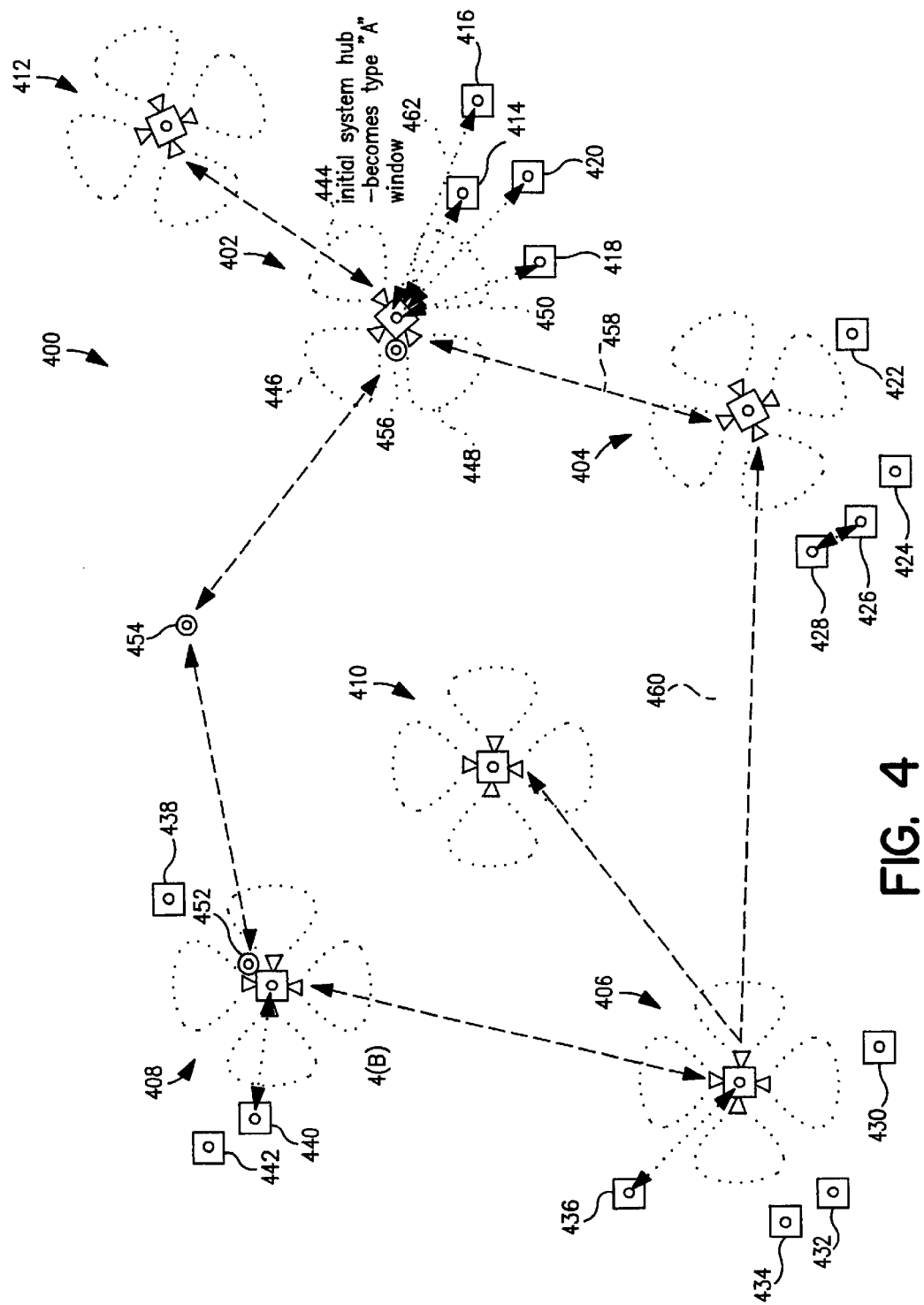
FIG. 4 depicts a wireless communication network according to the present invention.

Turning now to FIG. 4, that figure shows a wireless communication network 400. The network 400 includes hub nodes 402–412 and user nodes 414–442. Each hub may include a sectorized antenna system or an omnidirectional antenna to generate coverage through individual antenna patterns, for example the antenna patterns 444–450. Several external network gateways 452–456 are also illustrated and connect the nodes 402–442 to external networks, for example, cellular telephone and Ethernet networks. Numerous links are shown and include in particular the hub to hub link 458, the hub to hub link 460, and the hub to user link 462.

As noted above, the present invention allows a wireless network to grow and adapt dynamically, without complicated, time consuming, or expensive network engineering. Starting with a single initial node, for example, the hub 402, the network may assimilate additional nodes and thereby expand the network. Considering the initial hub 402 to be a type A hub operating over a time division duplex, code division multiple access layer, the hub 402 transmits a reservation channel scanned for by new nodes.

Since, at a hub, all channels are transmitted over a single carrier at the same time, the possibility of "cosite interference," produced by multiple transmitters operating at the same time is eliminated. The present invention provides for the elimination of cosite interference in a mobile application, or for peer-to-peer links.

The reservation channel is preferably formed using a known (to all nodes) CDMA spreading code. Embedded in the reservation channel is one or more assignable CDMA spreading codes and optionally additional control or status information. The control information may include, for example, node identification, routing topography, and antenna identification (e.g., identifying from which antenna the reservation channel is being generated).

The assignable CDMA spreading code is chosen from a store of spreading codes in the hub 402, and allows a new node to establish a link to the hub 402 using the assigned CDMA spreading code. The hub 402, as a type A node, transmits during the type A transmit window and receives during the associated receive window. Nodes that assimilate to a type A node will adopt the opposite timing and become type B nodes. Thus, the type B nodes will receive during the hub 402 transmit window and transmit during the hub 402 receive window.

Assuming, for example, that the user 416 is attempting to assimilate into the network, the user 416 scans, using the known reservation channel code, for the existence and burst timing of the reservation channel. The scanning process may, for example, execute a correlation search in a window several chips in width to locate the reservation channel. Upon discovering the reservation channel, the user 416 sends a handshaking response on the reservation channel to alert the hub 402 that the user 416 desires to enter the network 400.

The handshaking response (which provides a first estimate of latency between the nodes) may include, for example, node identification, antenna identification, and selection of spreading code. Handshaking signaling (including for example, a fine clock synchronization sequence) may then be exchanged on the reservation channel to ensure that the user 416 may use the assignable reservation code and is synchronized. Clock synchronization may be iterated to achieve synchronization within a predetermined error band.

In some instances, several nodes may attempt to simultaneously handshake with the hub 402, in which case signal collisions may occur. In such instances, the hub 402 will typically be unable to decode a correct handshaking response in the reservation channel and therefore transmit no response. The nodes attempting to assimilate may detect the absence of response (e.g., through the absence of a busy-bit being set in the reservation channel), and may then perform a backoff operation. The backoff operation may be similar to that used in, for example, Ethernet networks, to greatly lesser the chance of continuing collisions on the reservation channel.

After a successful handshake, the user 416 extracts the assignable CDMA spreading code and begins transmitting as a type B node over the link 462 determined by the assignable CDMA spreading code. A code tracking loop in the user 416 and the hub 402 may then be used to maintain synchronization in the assigned CDMA spreading code as each node switches between receiving and transmitting. In other words, when a node switches from transmit mode to receive mode, the receive spreading code will be synchronized with the local copy of the spreading code because the far end code generator tracks the spreading code transmitted from the near end.

The hub 402 may then choose another assignable CDMA spreading code to radiate in the reservation channel (which is preferably generated using the same well known reservation channel CDMA code). In a similar fashion, each of the users 414–420 assimilate as type B nodes to the type A hub 402.

The assimilation process, of course, is not limited to user nodes. Rather, hubs and other types of communications equipment may also proceed through the assimilation process. As an example, the hub 404 assimilates into the network 400 through the same process described above with respect to the user 416. Thus, the hub 404 enters the network as a type B node and communicates over the link 458 with the hub 402. The hub 404 may itself then begin to radiate one or more reservation channels of its own.

The hub 404 may thereby support its own user nodes. For example, the user nodes 422, 424 assimilate to the type B hub 404 and become type A nodes in communication with the hub 404. Thus, the users 422, 424 share the same transmit and receive window timing (although typically using different spreading codes) as the initial hub 402.

Continuing, the hub 406 may assimilate to the hub 404. The hub 406 thereby becomes a type A node and communicates with the hub 404 over the link 460. The users 430–436 and the hubs 408, 410 may assimilate to the hub 406 as type B nodes. Further expansion may result from assimilation of the users 438–442 as type A nodes to the hub 408, and the hub 412 as a type B node to the initial hub 402.

It is not necessary that links be established only between particular types of nodes. In other words, two users, two hubs, or any other combination of communication equipment nodes may exchange information. In particular, even two relatively simple user nodes may communicate.

As an example, consider the user 426 (which may be, for example, a military handset). The user 426 may radiate its own reservation channel (potentially at a much lower power level than a hub would be capable of generating) carrying an assignable CDMA spreading code. Thus, the user 428 (e.g., another military handset) may scan for, handshake with, and establish communication with the handset 426 through the same assimilation process described above. The user 426 may initiate its reservation channel with type A node timing, while the assimilated user 428 may then become a type B node.

It is further noted that spreading codes may be reused between multiple nodes. For example, the hub 408 and the hub 406 may be sufficiently distant to allow reuse of spreading codes with significant interference. Reuse may also occur by providing antenna isolation, even with respect to nearby nodes.

Omnidirectional antennas, preferably used on the user nodes, allow signal strength to fall off quickly and permit additional spreading code reuse. Furthermore, any of the nodes may be stationary or mobile in nature. Thus, a mobile hub may be used to quickly establish communication capability in a new locale. Note in particular that the network 400, starting from an initial hub 402, expanded without the time, expense, and complexity of transmission pre-planning.

Figure 5:
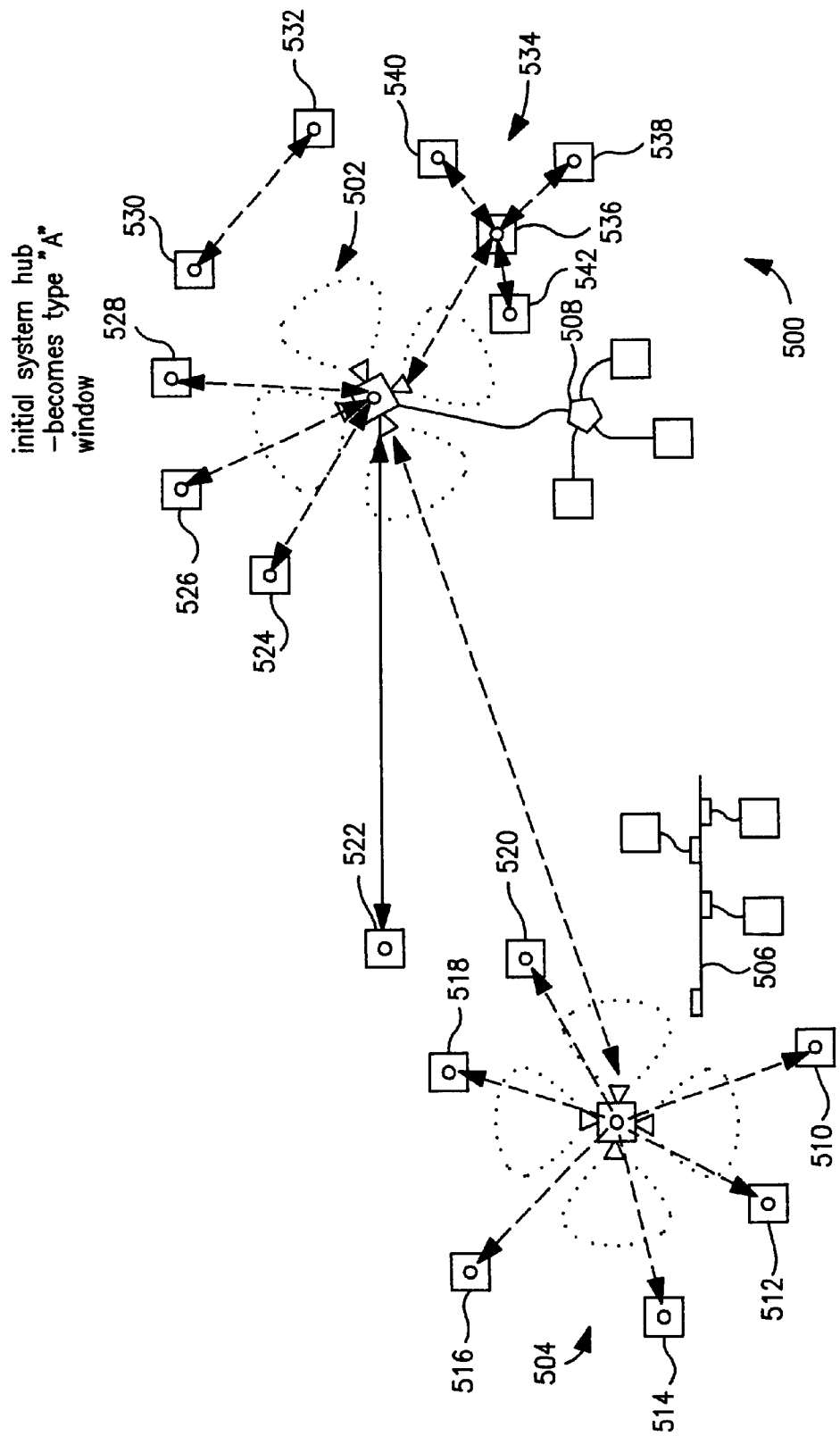
FIG. 5 shows connections between a wireless communication network according to the present invention and hard-wired networks.

Turning now to FIG. 5, that figure illustrates a network 500 including nodes communicating according to the present invention and further in communication with hardwired networks. FIG. 5 illustrates hubs 502 and 504 connected with hardwired networks 506 and 508 using, for example, Ethernet or AUI cable. Additionally, user nodes 510–532 are shown as well as a sub-network 534. The sub-network 534 includes a local server 536 and users 538–542.

In FIG. 5, the hub 502 initiates the network 500 as a type A node. The hub 504 and users 522–528 assimilate to the hub 502 as type B nodes. The users 510–520 assimilate to the hub 50 4 as type A nodes. The users 530 and 532 are in local communication with one another (as described above with respect to FIG. 4 and users 424–426).

The sub-network 534 uses a local server 536 which acts much like a regular hub, although it may be intentionally limited in power to provide communication to a local area. The local server 536 assimilates to the hub 502 as a type B node, while the users 538–542 assimilate to the local server 536 as type A nodes. Data may then pass from the users 538–542 through the local server 536 to the hub 502 and the rest of the network 500.

It is further noted that a node may deassimilate from the network and assimilate with another node. Thus, for example, the user 522 may initially communicate with the nearby hub 504. However, the user 522 may, for routing efficiency, for example, deassimilate from the hub 504 and instead assimilate with the hub 502. The user 522 changes from a type A node to a type B node in the process.

The wireless network established using the principles set forth above may use, for example, Asynchronous Transfer Mode (ATM) cell structure, switching, and routing. One benefit of ATM is that provides virtual circuit connections. In other words a path between nodes may be carried over the same links for the duration of the communication. Routing may then be addressed when the connection is setup during the assimilation process.

Figure 6A:
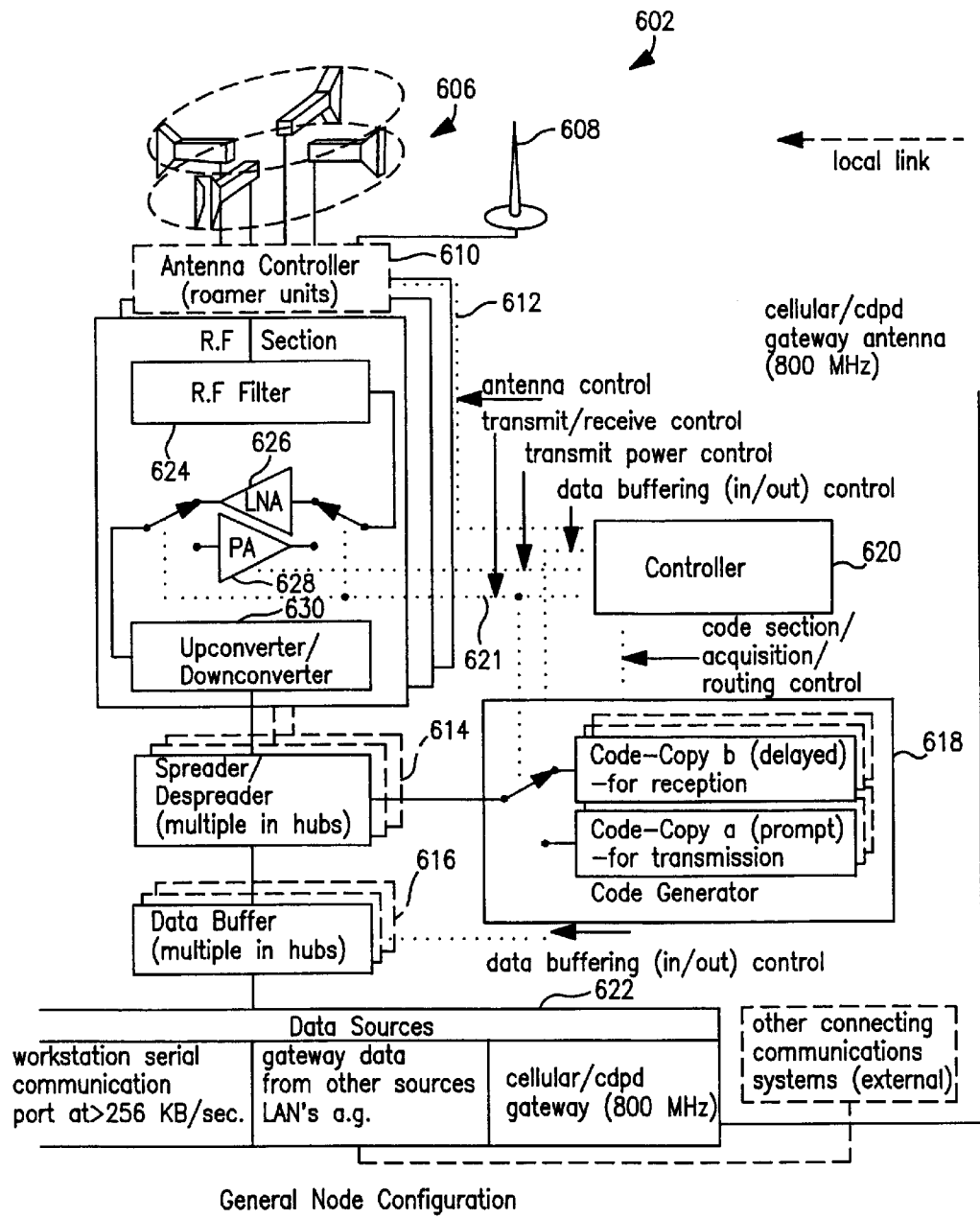
FIG. 6 illustrates exemplary hardware implementations of node configurations that may be used in the present invention.
Figure 6B:
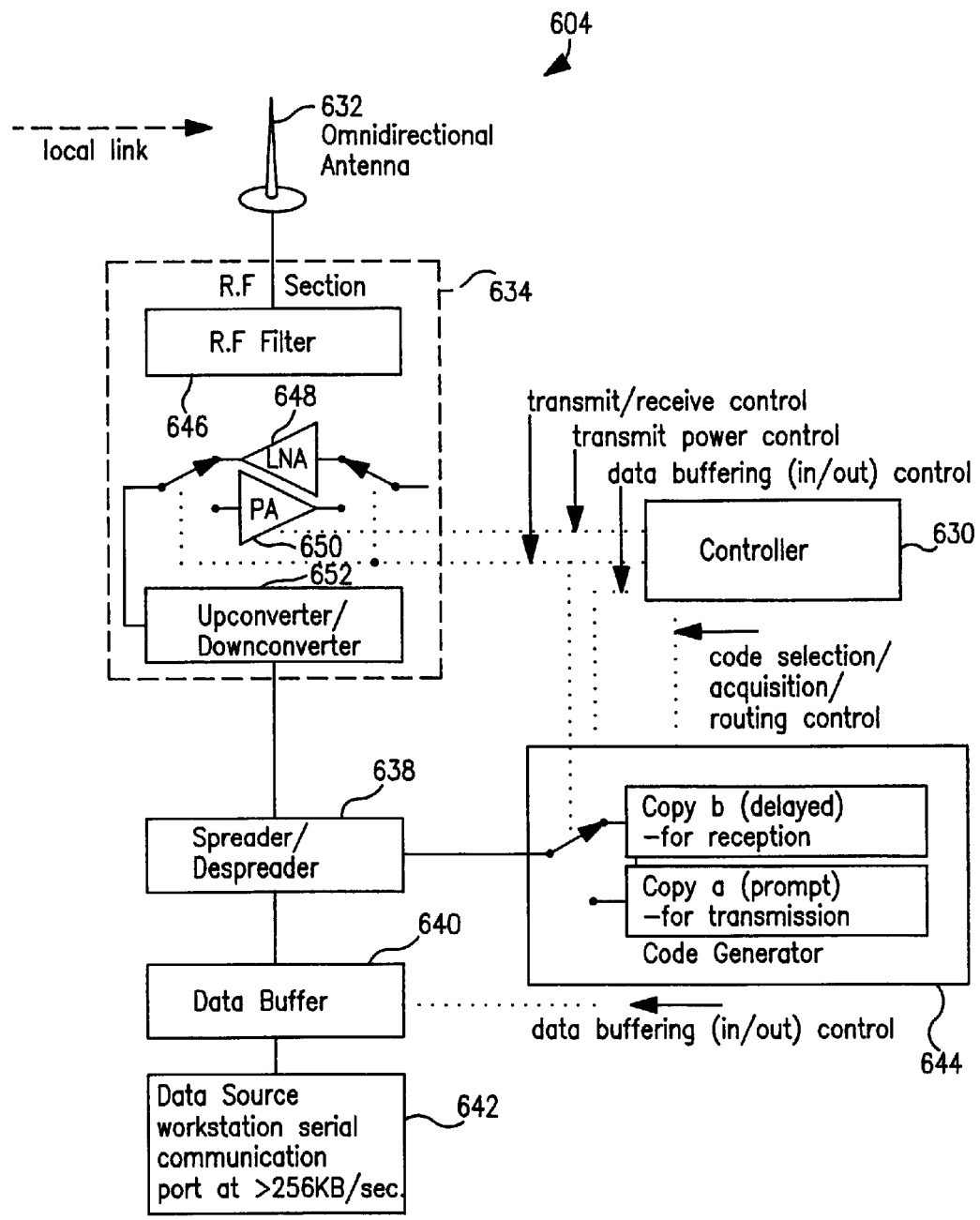

Turning now to FIG. 6, that figure shows one example of the hardware that may be used to implement communications equipment according to the present invention. FIG. 6 illustrates a general node configuration 602 (e.g., a hub), and a local node configuration 604 (e.g., a user).

The general configuration 602 includes a directional antenna 606 and an omnidirectional antenna 608 connected to an antenna controller 610. As an example, the antenna controller 610 may allow a roamer unit (equipped with both types of antennas) to use the high power directional antenna 606 to search for a reservation channel and subsequently switch to the lower power omnidirectional antenna for subsequent communication. The general configuration 602 also includes one or more RF sections 612, spreaders 614, and data buffers 616. A code generator 618 and system controller 620 (with transmit/receive control output 621) are also shown, as well as external data sources 622. Each RF section 612 includes an RF filter 624, a low noise amplifier (LNA) 626, a power amplifier (PA) 628, and an upconverter/downconverter 630.

During a transmit window, for example, the controller 620 reads data from the data buffer 616, and applies it to the spreader 614 in conjunction with the appropriate spreading code selected by the code generator 618. The controller 620 may be implemented with discrete circuitry or using a CPU and associated memory. The data may originate from numerous sources, including, for example, a workstation data link, a cellular network, or a hardwired Ethernet connection.

The spread signal is applied to the upconverter 630 where it is shifted in frequency (e.g., to a band in the 900 MHz region). The PA 628 amplifies the resultant signal and feeds it to the filter 624. The filtered signal is driven through one or more of the antennas as selected by the antenna controller 610.

The controller 620 operates in synchronism with clock signals (not shown), including CDMA chip clocks, that delineate the transmit and receive windows. The clock signals may also be used by the spreader 614 and data buffer 616 to control delays that compensate for propagation delay over a wireless link to another node. Multiple copies of the RF section 612, spreader 614, and data buffer 616 may be provided and associated with each RF (antenna) section.

Furthermore, the code generator 618 typically stores multiple spreading codes, each code associated with a link or reservation channel. The code generator 618 typically supplies the spreading code for transmission without compensating for propagation delay (i.e., a "prompt" version of the code). While receiving, however, the code generator 618 may provide a copy of the code (associated with a particular link) delayed to compensate for propagation delay to the spreader 614. It is further noted that all outgoing links are transmitted simultaneously during the transmit window and all links are received simultaneously during the receive window.

During the receive window, the antennas receive an impinging signal and provide it to the RF filter 624. The signal flows through the LNA 626 for amplification and to the upconverter/downconverter 630 for frequency translation to an intermediate frequency. The resultant signal is despread in the spreader 614 under control of the spreading code appropriate for the link. The data recovered from the despread signal is saved in the data buffer 616.

Turning now to the local node 604, it includes many of the same components as the general node 602. The local node 604, however, is provided to illustrate a typical user node (e.g., a wireless phone), and therefore includes a single instance of several hardware components. The local node 604 includes an omnidirectional antenna 632, an RF section 634, and a system controller 636. A spreader 638, data buffer 640, a data source 642, and a code generator 644 are also present. The RF section 634 includes an RF filter 646, LNA 648, PA 650, and an upconverter/downconverter 652.

The hardware components of the local node 604 operate as explained above with respect to the general node 602. Although shown with only a single RF section 634, for example, the local node 604 may include additional hardware to support additional links (to provide, for example, additional bandwidth) as in the general node 602. Thus, for example, the local node 604 may include two sets of hardware to support two concurrent links to double its bandwidth to a single node, or to communicate with two different nodes.

Figure 7:
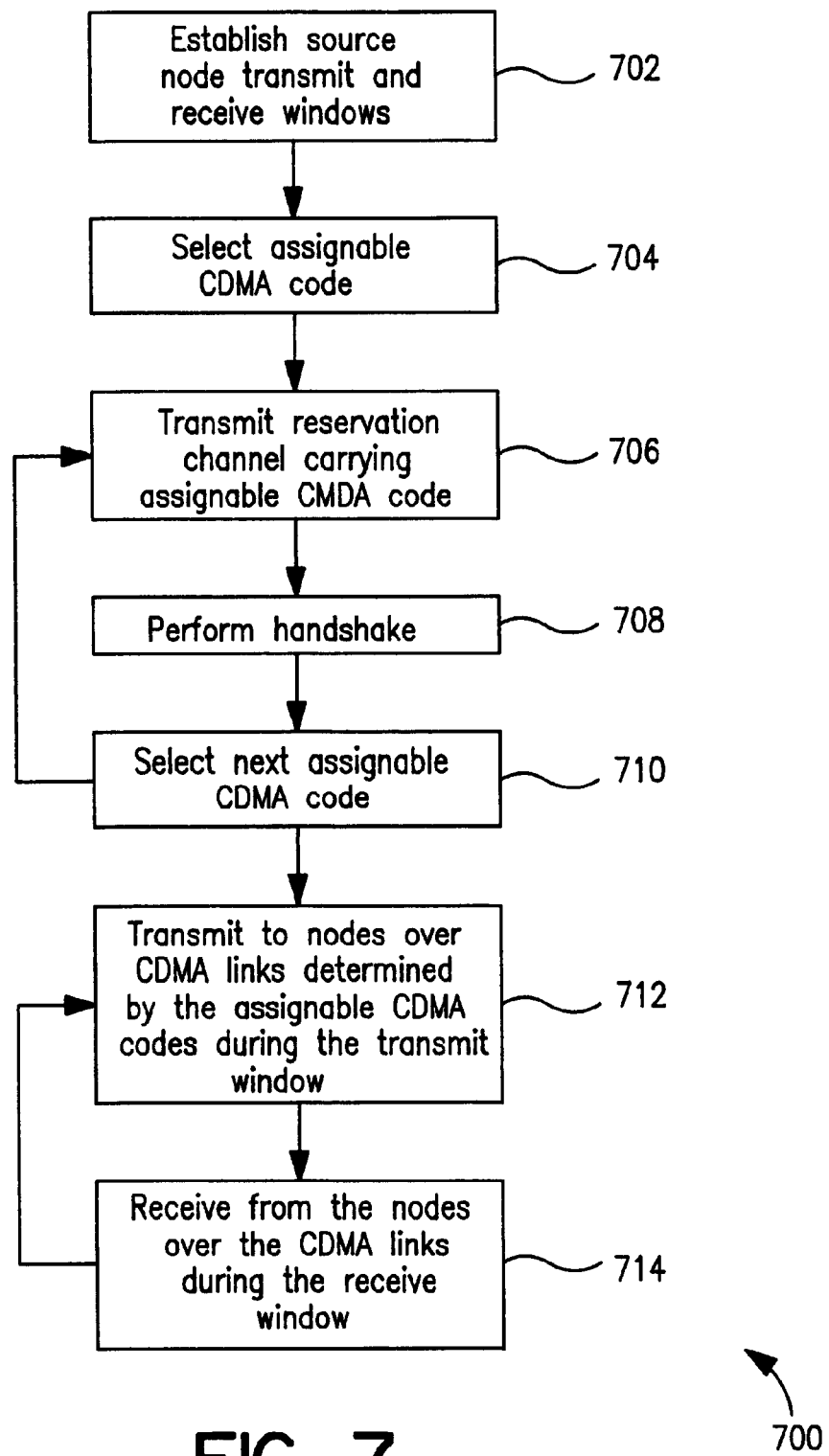
FIG. 7 shows a high level flow diagram of communication according to the present invention.

Turning to FIG. 7, that figure shows a high level flow chart 700 of the communication technique of the present invention. At step 702, the transmit time window and receive time windows are established. As noted above, the two windows need not be equal in length. At step 704, an assignable CDMA code is selected, and at step 706 it is transmitted in a reservation channel.

If necessary, handshaking is performed at step 708. Thus, a new node may assimilate to an existing node as described above. Subsequently, a new assignable CDMA code is selected at step 710, and it is transmitted in the reservation channel at step 706.

Assuming that one or more nodes have assimilated to the network, the nodes communicate in their respective transmit and receive windows. Thus, at step 712, type A nodes transmit to type B nodes during the transmit window over individual CDMA links. At the same time, the type B nodes receive the transmissions from the type A nodes. At step 714, the type A nodes receive from the type B nodes during the receive window over the same individual CDMA links. In other words, the type B nodes transmit at step 714 while the type A nodes receive. The time division operation described continues as long as there are links in operation as shown by the loop back to step 712.

The present invention thus provides a wireless communication system that is alterable and extendable without significant transmission engineering or pre-planning. The communication system supports mobile hubs that are wirelessly interlinked. The present invention also provides a novel physical layer that implements synchronized time division duplex, spread-spectrum connections that are channelized by code division multiple access techniques.

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features which come within the spirit and scope of the invention.

What is claimed is:

1. A method for providing an expandable wireless communication network including users capable of supporting a link to a hub, and hubs capable of supporting multiple links between users, the method comprising:

establishing a source node transmit window and a source node receive window;

selecting a first assignable CDMA spreading code for use in a first communication link;

transmitting from a source node during the source node transmit window a reservation channel carrying the first assignable CDMA spreading code;

detecting a handshaking response at the source node during the source node receive window;

in response to a successful handshake, selecting a second assignable CDMA spreading code for use in a second communication link; and transmitting from the source node during the source node transmit window the reservation channel carrying the second assignable CDMA spreading code, wherein the establishing step comprises establishing source node transmit and source node receive windows unequal in duration.

2. The method of claim 1, further comprising:

decoding the handshaking response;

transmitting to a destination node during the source node transmit window using the assignable CDMA spreading code; and receiving from the determined destination node during the source node receive window using the assignable CDMA spreading code.

3. The method of claim 2, further comprising the step of establishing a virtual circuit for the destination node.

4. The method of claim 3, wherein said establishing step includes assigning a Quality of Service to the determined destination node.

5. The method of claim 1, wherein the step of transmitting the first assignable CDMA reservation code comprises transmitting from a hub source node to a user destination node and the detecting step includes receiving from the user destination node.

6. The method of claim 1, wherein the step of transmitting the first assignable CDMA reservation code comprises transmitting from a hub source node to a hub destination node and the detecting step includes receiving from the hub destination node.

7. The method of claim 1, wherein the step of transmitting the first assignable CDMA reservation code comprises transmitting from a user source node to a user destination node and the detecting step includes receiving from the user destination node.

8. A method for providing an expandable wireless communication network including users capable of supporting a link to a hub, and hubs capable of supporting multiple links between users, the method comprising:

establishing a source node transmit window and a source node receive window;

selecting a first assignable CDMA spreading code for use in a first communication link;

transmitting from a source node A during the source node transmit window a reservation channel carrying the first assignable CDMA spreading code;

scanning for the reservation channel at a destination node B and extracting the first assignable CDMA spreading code;

transmitting from the destination node B a handshaking response on the reservation channel;

detecting the handshaking response at the source node A during the source node receive window;

transmitting from the source node A during the source node transmit window to the destination node B over the first communication link determined by said first assignable CDMA spreading code;

receiving from the destination node B during the source node receive window over the first communication link determined by said first assignable CDMA spreading code;

transmitting during the source node receive window from the destination node B a second reservation channel carrying an additional assignable CDMA spreading code for use in an additional communication link;

detecting an additional handshaking response at the destination node B during the source node transmit window, transmitting from the destination node B during the source node receive window to a destination node C over the additional communication link determined by the additional assignable CDMA spreading code; and receiving from the destination node C during the source node receive window over the additional communication link determined by the additional assignable CDMA spreading code.

9. The method of claim 8, further comprising:

in response to a successful handshake, selecting a second assignable CDMA spreading code for use in a second communication link; and transmitting from the source node A during the source node transmit window the reservation channel carrying the second assignable CDMA spreading code.

10. The method of claim 8 further comprising the step of establishing a virtual circuit for the destination node B.

11. The method of claim 10 wherein said establishing step includes assigning a Quality of Service.

12. A communication node adapted to provide an expandable wireless communication network over a time division, code division access layer, the communication node comprising:

an antenna for radiating an outgoing spread spectrum signal and receiving a spread spectrum incoming signal;

a first RF section coupled to the antenna;

a spread spectrum speader coupled to the first RF section;

a spreading code generator coupled to the spreader;

a controller including a transmit control output coupled to the first RF section and the code generator for transmittng data in the outgoing signal during a transmit window and receiving data in the incoming signal during a receive window; and at least one additional RF section supporting at least one additional outgoing spread spectrum signal, and wherein the additional RF section and the first RF section are coupled together to transmit simultaneously during the transmit window and receive simultaneously during the receive window.

13. The communication node of claim 12, wherein the first RF section comprises an RF filter, low noise amplifier, power amplifier, and an upconverter/downconverter.

14. The communication node of claim 12, further comprising a data buffer coupled to the spreader.

15. The communication node of claim 14, further comprising at least one connection to a data source.

16. The communication node of claim 12, wherein the antenna is an omnidirectional antenna.

17. The communication node of claim 12, wherein the antenna is a sectorized antenna system.

18. The communication node of claim 12, wherein the code generator comprises an assignable spreading code and a reservation spreading code for generating a reservation channel carrying the assignable spreading code, and wherein the RF section couples a reservation channel signal carrying the assignable spreading code to the antenna.

* * * * *